UNITED STATES PATENT OFFICE.

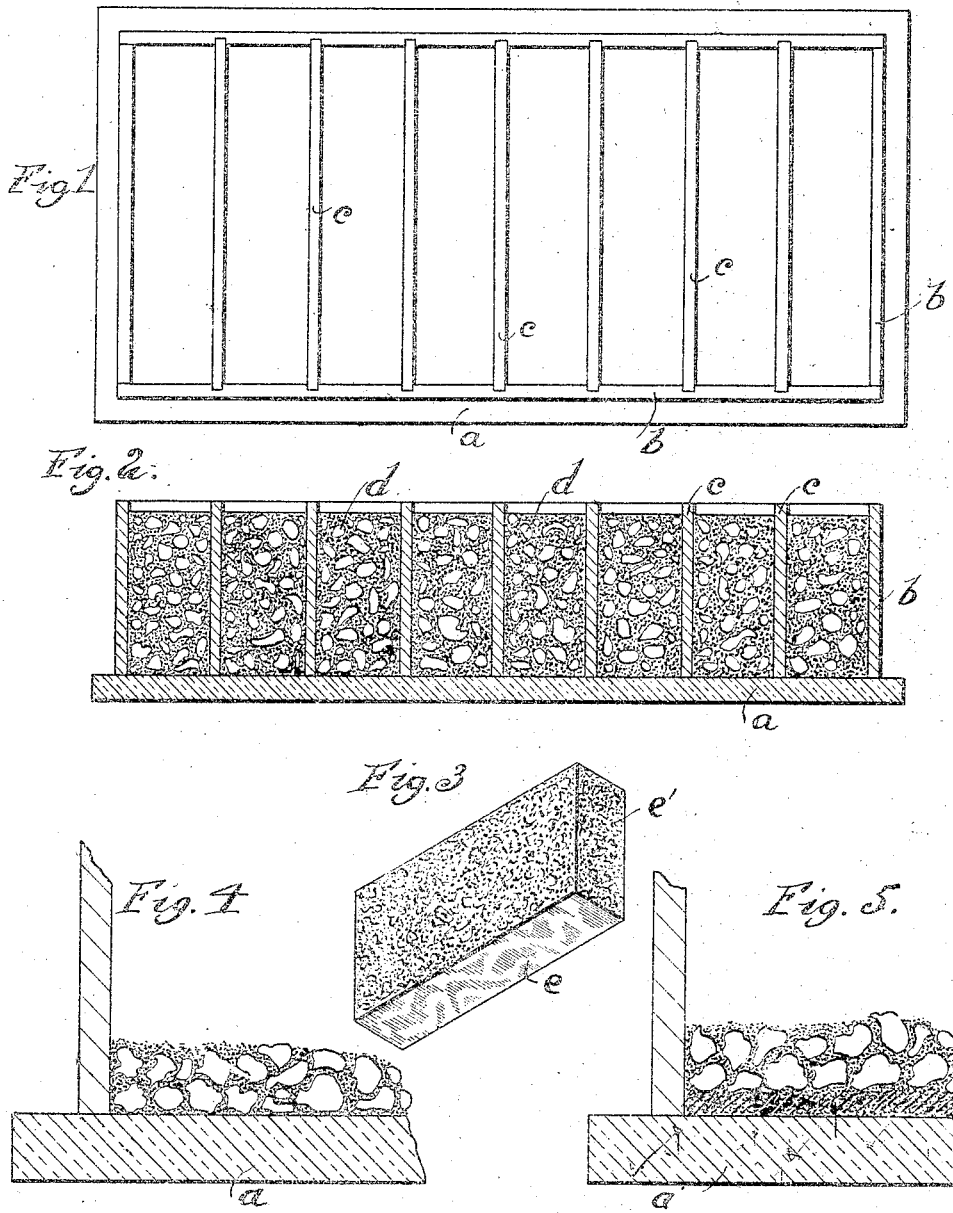

GEORGE H. BARTLETT, OF BOSTON, MASSACHUSETTS.

METHOD OF MAKING ORNAMENTED MOLDED CONCRETE ARTICLES.

No. 829,249. Specification of Letters Patent. Patented Aug. 21, 1906.

Application filed March 31, 1906. Serial No. 309,075.

*To all whom it may concern:*

Be it known that I, GEORGE H. BARTLETT, of Boston, in the county of Suffolk and State of Massachusetts, have invented certain new and useful Improvements in Methods of Making Ornamented Molded Concrete Articles, of which the following is a specification.

This invention has for its object the production of a relatively inexpensive ornamental molded non-combustible body adapted for use as a brick or other structural unit or for other purposes, the said body having a molded face which is characterized by smoothness and by a brilliant gloss or luster, the said face resembling in these characteristics that of ordinary transparent smooth-surfaced glass or highly-polished natural stone.

My invention consists in an improved method of making ornamented articles of manufacture—to wit, a brick or other body composed of concrete (which includes suitable inert ingredients and hydraulic cement) and having a smooth and glossy or lustrous ornamental face formed by the setting or crystallization of a surface portion of the cement in contact with a smooth and glossy or lustrous mold-surface, the face thus formed being characterized by absolute conformity or fidelity to the forming-surface in the matter of smoothness and gloss or luster in consequence of the presence of the inert ingredients forming the major part of the bulk of the concrete mixture.

Of the accompanying drawings, Figure 1 represents a plan view of one form of mold which may employed in producing an ornamented concrete brick according to my invention. Fig. 2 represents a longitudinal section of the mold shown in Fig. 1, the compartments of the mold being filled with the concrete. Fig. 3 is a perspective representation of an ornamented concrete brick produced according to this invention. Figs. 4 and 5 are enlargements of portions of Fig. 3.

The same reference characters indicate the same parts in all the figures.

In making concrete bricks the mold which may be employed may comprise a base $a$, which may be made of any material having a smooth and glossy upper forming-surface which is moisture repellant and to which Portland or other hydraulic cement will not adhere during the setting and hardening. An outer rectangular frame $b$, having partitions $c$, is placed upon the base $a$, and the spaces between said partitions $c$ are filled with a concrete-cement mixture according to the ordinary "wet process," in which there is an excess or superabundance of water employed. The concrete is represented at $d$ and includes suitable inert materials, such as broken stone and sand and hydraulic cement reduced by water to a paste. Suitable proportions are broken stone six parts, sand three parts, and cement one part. These proportions may be varied, however. The material is deposited in the mold until it fills or nearly fills the spaces or chambers between the partitions $c$ and the side walls $b$ and is allowed to set and harden, care being taken to insure contact of the plastic cement with all parts of the forming-surface of each mold. The material of which the sides $b$ and the partition $c$ are made form no part of this invention. It may be wood, stiff waterproof paper, leatherboard, tin, or any other kind of metal. It is preferable that the sides of the brick which engage the mortar in a wall shall be rough, so as to better interlock with the mortar; but in accordance with my invention the face $e$, which is exposed at the front of the wall, is very smooth and glossy or lustrous, so as to present a surface resembling in gloss or finish that of highly-polished granite or marble and owing to the fineness of the grain of the surface to more successfully resist absorption of moisture. The practice of this invention has demonstrated that the base $a$ may be made of celluloid or of hard rubber or of japanned or nickled plates, sheets, or surfaces, presenting a forming-surface which is smooth and glossy or lustrous. By placing a flat sheet or panel of either of said materials or of any other suitable material on a smooth table or bed with its glossy forming-face upward a bottom may be formed for a mold partitioned to form as many bricks as is found practicable. The strips of wood, tin, fiber board, or other material forming the sides and partitions of the mold are so placed relatively to each other and are of such sizes that the bricks formed in the spaces of the mold will be formed with a narrow edge downward. In other words, a brick of the usual dimensions of two by four by eight inches will be formed in a mold which is two inches wide, four inches deep, and eight inches long. The casting or molding of the bricks in this manner provides a smoother and more glossy face for the surface that is to be exposed in the wall of a building than if the brick should be formed in a mold of a two-inch depth and four-inch width. The reason for this is that the weight of all of the material forming each brick is borne by a relatively small area, and therefore the pressure upon the cement in contact with the glossy forming-surface of each mold will be greater when the brick is molded edgewise than if it were molded flatwise.

When it is desired to cast or mold bricks which are to be used at the corner of a wall, it is desirable that one end of the brick shall have a polished surface to correspond with the polished surface indicated at $e'$ in Fig. 3 of the drawings. For this purpose a thin strip of the polished moisture-repellant and non-adhesive material may be placed against one end wall of each brick-mold prior to pouring in the concrete.

The cement may be colored, if desired, so that the glossy surface may present any shade that is wanted. I have found that in using colored cement a desirable mottled effect may be produced, the glossy cement face having a given shade where parts of the inert material lie close to the said face, and a different shade where the face is backed by cement contained in voids in the mass of inert material. To insure uninterrupted contact of the cement with all parts of the forming-surface, it may be desirable in some cases to apply a thin coating of cement to the forming-surface before inserting the concrete mixture in the molds, this coating subsequently uniting with the cement ingredient of the mixture.

While I have thus particularly described my invention as embodied in a concrete brick and the method of making the same, I do not confine myself to a brick-shaped article, it being obvious that a concrete body ornamented as described of any shape capable of being formed in a mold may be produced without departing from the spirit of my invention. A spherical body of concrete may be formed in a hollow spherical mold internally smooth and glossy, and said mold may be a hollow globe requiring breakage to uncover the molded body, or it may be of sectional construction, so that it may be opened or dissected to uncover the molded body. I have conclusively demonstrated that the face formed by the crystallization or setting of a surface portion of the limited quantity of hydraulic cement contained in a body of ordinary concrete mixture by contact with a glossy forming-surface is more a perfect replica of the said forming-surface than the face of an all-cement body formed in the same way. The relative imperfectness of the face of the all-cement body may be due, in part at least, to the recession of water from the cement in contact with the forming-surface of the mold prior to and during the process of crystallization, the recession being due to absorption by the relatively large mass of cement of enough water from the surface to cause the numerous minute depressions hereinbefore referred to in the formed face. In a concrete body there is no thick mass of cement capable of absorbing water from the surface portion, the stone and sand which form the major part of the mass being nonabsorbent.

While I have mentioned the possibility of first applying a coating of cement to the glossy forming-surface of the mold before inserting the concrete mixture, I desire it understood that such procedure is desirable chiefly when the surface cement is given a distinctive color. When a distinctive surface color is not desired, contact of the cement with all parts of the forming-surface of the mold may be secured by the natural flowage of the cement, the latter being of about the consistency of cream, so that it will flow through the voids of the mass of inert matter and spread over the forming-face. After the concrete material is deposited in the mold, it is permitted to remain in contact with the glossy panel until the face formed by such contact has crystallized and thoroughly hardened, so that the polish will be permanent. During this time the surplus water in the concrete mixture will settle to the bottom and carry with it the finest particles to form the face of the articles, and then the surplus water will drain out between the bottom edges of the sides of the mold and the surface of the panel, leaving the face composed of the finest particles. Consequently the bottom of the article is the last to dry and harden and will present a fine-grained surface that will retain its polish. Even if there were no such draining of surplus moisture the same result will be attained, because the lower layer or stratum is so far from the drying effect of the atmosphere as to result in causing the last hardening and crystallization to take place in the portion of the material that is in contact with the glossy panel. During all of this time the face of the article that is formed by the glossy panel is subject to the weight of the material above it (or to additionally applied weight or pressure, if desired), and is protected by said panel from the atmosphere, so that the latter can not affect the polish or crack the polished surface. By leaving this contact undisturbed until the said surface has become thoroughly hardened or what might be termed "bone-dry," the best effect or result is obtained as to polish and permanency of that polish. It is to be understood that in order to obtain these results it is not always necessary to leave the mold intact, for the sides $b$ and $c$ might be removed after the article has set sufficiently to retain its form, but leaving it upon the panel or base $a$ until so hardened that the polished face will be permanent and capable of resisting atmospheric or climatic influences.

I claim—

1. The method of making a concrete article, consisting in confining concrete material containing an excess of water in contact with a polished and non-adhesive panel beneath said material, and allowing the same to remain in such contact until dry and thoroughly hardened and provided with a permanent polish.

2. The method of making a concrete article having a polished surface, consisting in confining a requisite quantity of concrete material containing an excess of water during the setting and hardening and drying of the material, with a lower face portion thereof in contact with a polished, moisture-repellant, and non-adhesive surface or panel.

3. The method of making a concrete article having a polished surface consisting in preparing the concrete material under the "wet process," and confining a requisite quantity of such material during the setting and hardening thereof, with a lower portion in contact with a polished, moisture-repellant, and non-adhesive surface or panel, until it becomes dry and hard.

4. The method of making a concrete article having a polished surface, consisting in depositing concrete material including hydraulic cement with an excess of water in a mold having a glossy bottom panel, and allowing the same to remain in contact with said panel during the settling and draining of the water in the material thereby causing the last hardening to take place in the portion of the article that is in contact with said panel, the said article remaining in contact with the panel until thoroughly hardened and dried and provided with a permanent polish.

5. The method of making a concrete article having a polished surface, consisting in molding a requisite quantity of concrete material containing an excess of water in a mold having a greater depth than width, and having a polished, moisture-repellant, and non-adhesive bottom surface or panel, and leaving said material in the mold during the setting and hardening and drying of the cement, whereby the said article is formed with a glossy narrow edge.

6. The method of making an ornamented concrete article which consists in depositing upon a smooth and glossy forming-surface a mass of concrete which includes hydraulic cement containing an excess of water, causing the cement to cover the forming-surface, and confining the mass until the cement crystallizes and dries.

7. The method of making an ornamented concrete article which consists in depositing a coating of hydraulic cement upon a smooth and glossy forming-surface, and then depositing upon said coating a mass of concrete containing a hydraulic cement and an excess of water, the cement of the concrete uniting with said coating, and confining the said mass until the cement crystallizes and dries.

In testimony whereof I have affixed my signature in presence of two witnesses.

GEORGE H. BARTLETT.

Witnesses:
C. F. BROWN,
E. BATCHELDER